July 5, 1960
P. L. ALGER
2,944,171
INTERMEDIATE RING SQUIRREL CAGE ROTOR
Filed Jan. 4, 1957
3 Sheets-Sheet 1
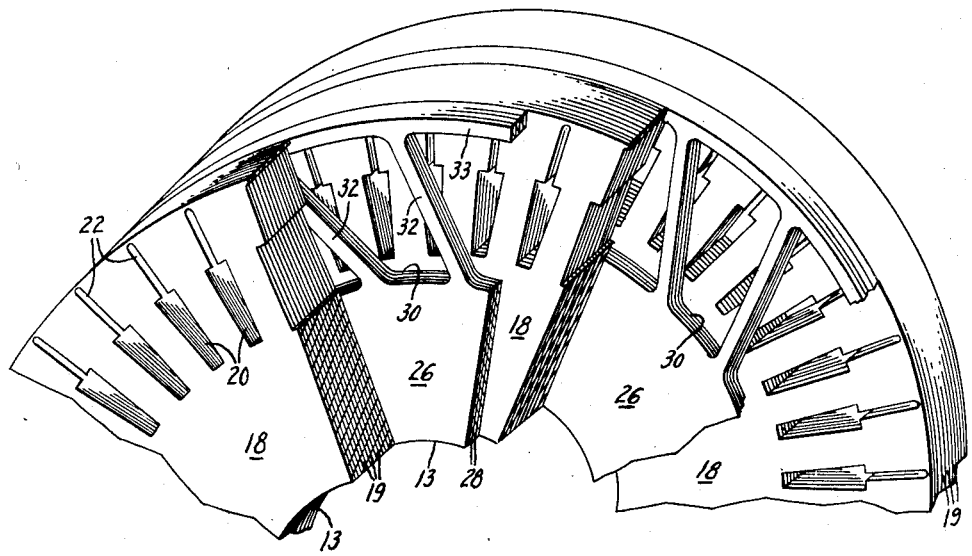
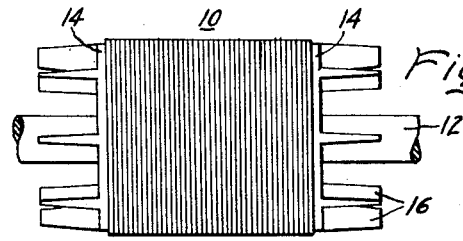
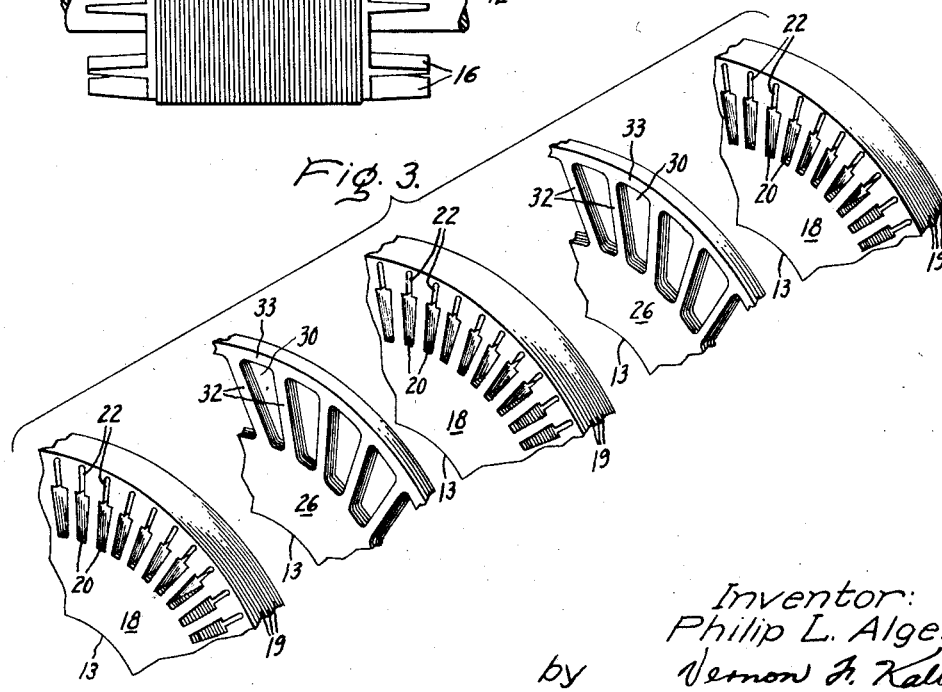
Inventor:
Philip L. Alger,
by Vernon F. Kalb
His Attorney.

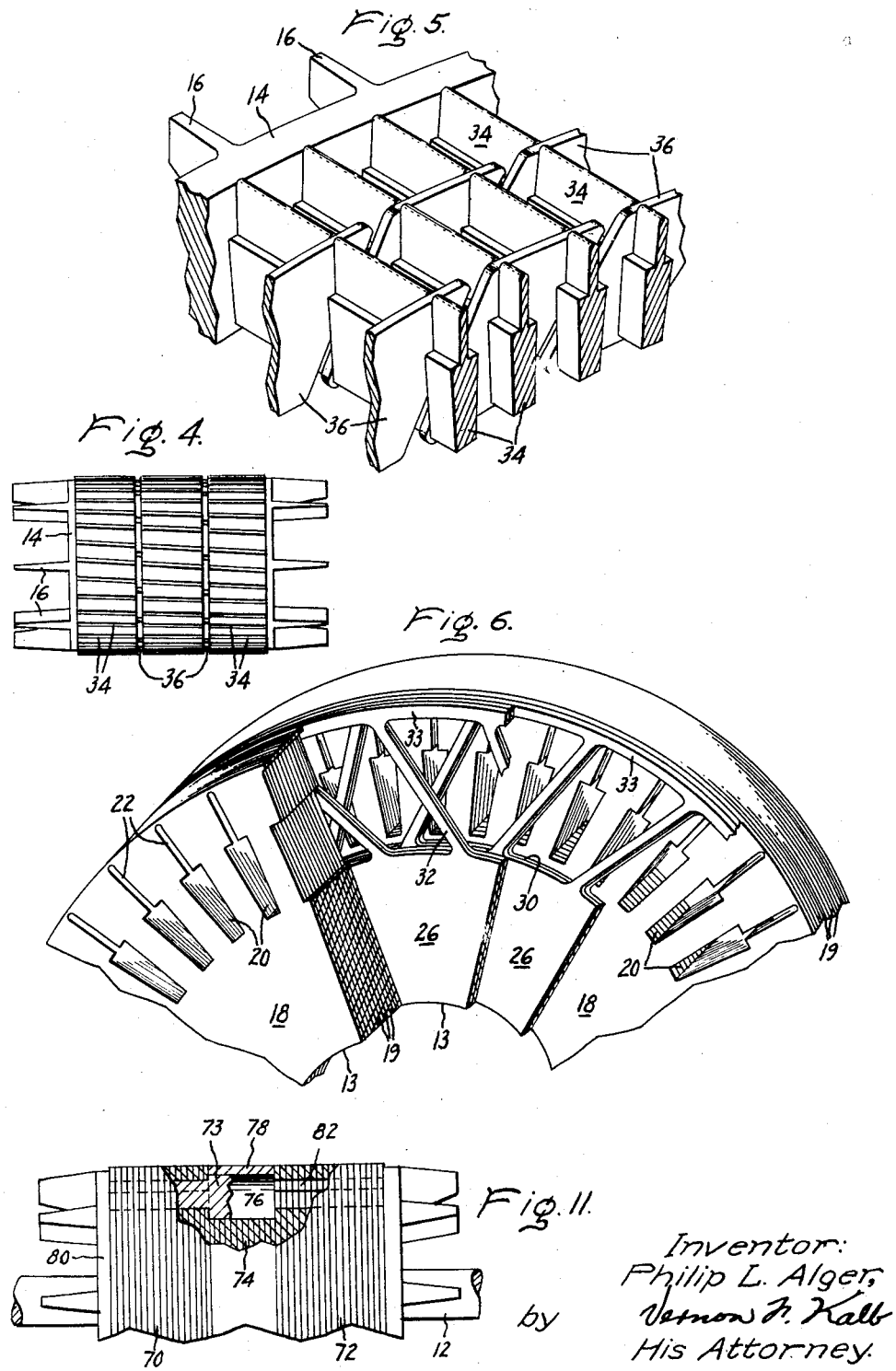

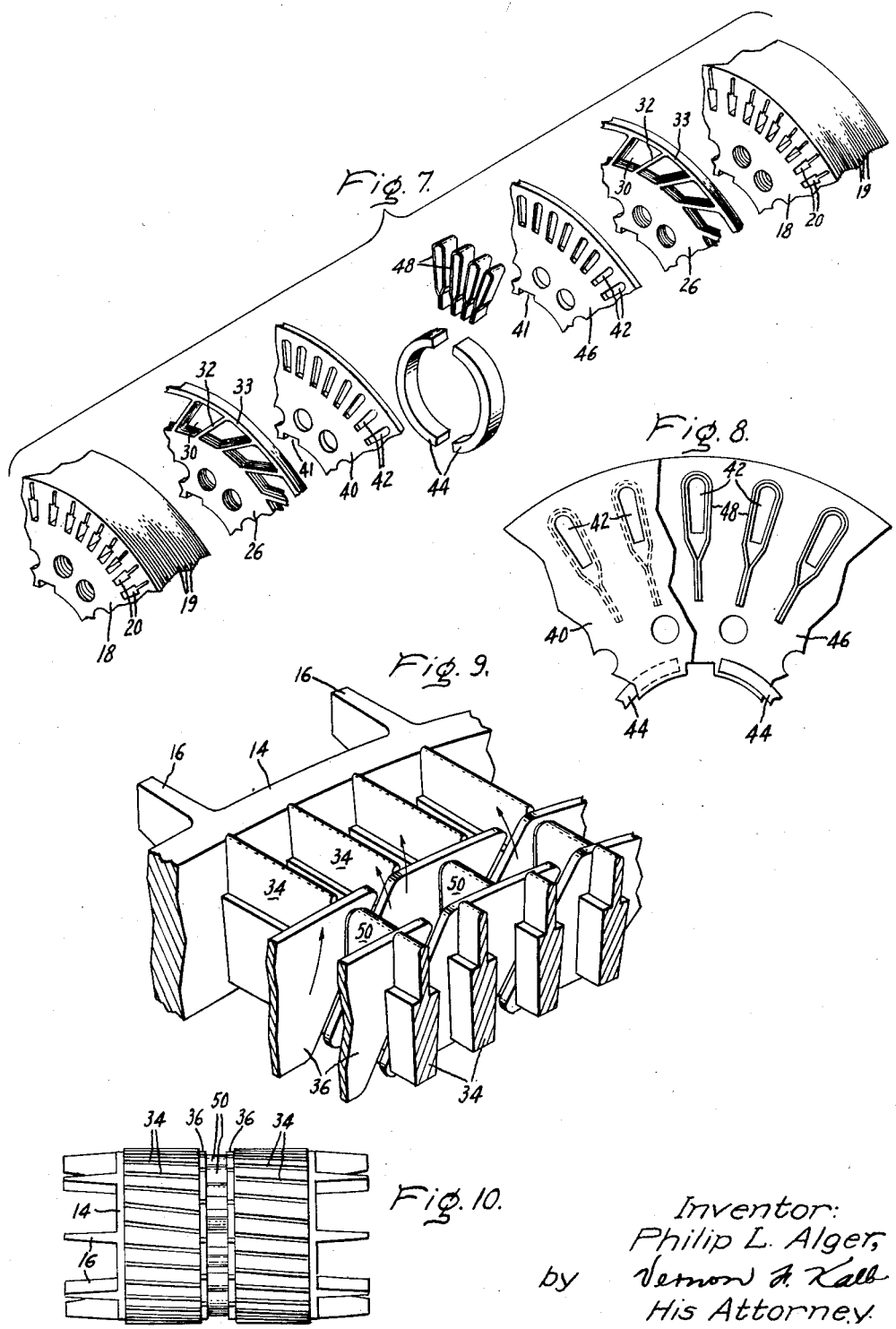

United States Patent Office 2,944,171
Patented July 5, 1960

2,944,171

INTERMEDIATE RING SQUIRREL CAGE ROTOR

Philip L. Alger, Schenectady, N.Y., assignor to General Electric Company, a corporation of New York Filed Jan. 4, 1957, Ser. No. 632,528

9 Claims. (Cl. 310—211)

The invention described herein relates to dynamoelectric machines and more particularly to an improved induction motor squirrel cage rotor of the type having intermediate conducting rings located between the end rings of the squirrel cage winding.

The concept of utilizing intermediate rings in squirrel cage rotors has been known for many years, but this construction has not been widely used because there has been no known method for its economical manufacture, and also, because its advantages have not been generally appreciated.

The construction of a rotor with intermediate rings consists of a laminated magnetic core made of a plurality of steel punchings assembled in sections on a shaft. The laminations throughout each section are provided with aligned slots for receiving the conductor bars and the sections are axially spaced a short distance apart on the shaft. Heretofore, the spacing of the sections has been obtained by using laminations of reduced diameter, usually less than the diameter appearing between the bottoms of a pair of oppositely disposed rotor slots, to form annular intermediate spaces between the sections that are open at the outer surface of the rotor. Usually, the complete squirrel cage with its intermediate rings and end rings is formed of a single aluminum or alloy casting produced by locating the rotor in a mold tightly encompassing the rotor peripheral surface and pouring the molten metal into one end of the rotor, and allowing it to fill the slots, the two end ring molds, and the intermediate ring spaces in one operation.

The known advantage of this intermediate ring construction is that it provides a closed current path around each axial section of each tooth allowing the magnetic flux in each section to be equalized by induced currents independently, whereas without the intermediate rings there may be a considerable difference between the flux linking equal areas of tooth at different points along the rotor core length. This greater uniformity of the axial flux distribution contributes to a reduction of the magnetic forces in the air gap, and thereby may reduce the noise and vibration of the motor. It also tends to reduce the leakage reactance of the motor when the slots are skewed.

There are important disadvantages however in such prior methods of construction of intermediate ring rotors. The intermediate rings are open to the rotor surface, so that they must be enclosed in some manner to contain the molten metal during casting. At best, there will be some leakage of the cast metal at the surface which must be cleaned up afterwards to reduce surface losses due to induced high frequency currents in operation of the motor. Also, a valuable part of the air gap area is taken up by the exposed intermediate rings, requiring a larger magnetizing current. Unless the rings are cut down to a smaller diameter than that of the laminated sections, there will be extra eddy current losses in them.

However, the use of intermediate rings properly made does offer great advantages over the usual construction of cast squirrel cage rotors. When a rotor without intermediate rings is skewed, and the bars are insulated from the rotor laminations, the current in each bar is constrained to have the same value throughout the core length. Since the currents in consecutive stator slots differ in time phase, and therefore in magnitude because of the electrical angle represented by the slot pitch, and since the rotor bar at one end of the skewed rotor will be opposite a different stator slot than at the other end, there will be a considerable difference between the rotor current at any point on the rotor and the stator current immediately opposite across the air gap. This difference of currents will normally be small at the center of the core length, and large at the two ends of the rotor. These differences in opposing stator and rotor currents which occur when the slots are skewed produce considerable amounts of "skew leakage flux" which reduces the motor torque and power factor besides contributing to extra magnetic forces, noise, and vibration. When intermediate rings are provided, the current in each rotor bar, in each section between rings, adjusts itself to near equality with the stator current immediately opposite. Small equalizing currents flow in the intermediate rings accordingly. This reduces the skew leakage flux to that corresponding to the angle of skew of one rotor section. Since the skew reactance varies as the square of the skew angle, approximately, this reduces the total skew reactance of the motor to about one-quarter if there are two equally spaced intermediate rings, or one-ninth if there are three such rings.

If the rotor bars are not insulated from the laminations when the rotor is skewed, the voltages between consecutive rotor bars due to skew leakage flux will cause currents to flow peripherally between bars through the laminations, especially in the center of the core length. Due to the high and variable resistance of this bar to bar current path, large stray losses may be produced; especially in single phase motors at high loads, because of relatively high bar to bar currents caused by the double line frequency voltages then occurring. It is difficult and expensive to provide a good or a uniform insulation of the rotor bars. The need for good insulation with skewed slots increases with the size of motor; and the need also is greater when the number of rotor slots exceeds the stator slots.

If the rotor is not skewed, the motor may have low accelerating torque, and/or may have considerable "cogging," or locking torque at standstill, in addition to extra core and stray load losses. If the rotor is skewed, and the insulation is inadequate, these disadvantages are still present while the extra losses may be much greater. These extra losses in a skewed rotor occur chiefly at the center of the core length, as noted above, in a region that is inaccessible to cooling air unless radial air ducts are used, so that they contribute a great deal more to the temperature rise of the motor than comparable losses occurring elsewhere.

The undesirable effects of induced rotor currents can be markedly reduced by employing fewer rotor than stator slots. But in this case there is likely to be more cogging and the tooth frequency forces are also greater, making it even more necessary to skew the rotor. With fewer rotor than stator slots, the motor reactance is increased, so that the additional reactance due to skew is doubly objectionable.

When intermediate end rings are used, it is no longer necessary to provide any rotor slot insulation, because the low resistance paths through the intermediate rings allow the needed bar to bar currents to flow without the extra losses associated with their flow through the iron between adjacent bars. Also, since the extra reactance due to skew is then very small, the use of fewer rotor than stator slots does not increase the motor reactance nearly as much as when intermediate rings are not used.

Another very important advantage of intermediate end rings is that they allow different numbers and/or different shapes of slots to be used in the different sections of the rotor core length. The molten metal flowing axially through the slots of the first core section can redistribute itself when it reaches the first intermediate ring, and can enter freely into the slots of the second core section, regardless of any differences in the numbers or shapes of the slots in the two sections. In this way, and by suitably choosing the number of rotor sections and/or their lengths, a wide range of performance may be secured by using different types of slots in the different core sections. Thus, it is possible to average out the undesirable effects of any one number of rotor slots, or to obtain a wide variety of results with only two or three slot dies. A great deal of freedom in design may be secured in this manner when intermediate rings are used.

This freedom is especially useful in large motors having radial rotor air ducts. If the same number of rotor bars crossing the ducts are used as in the laminations, there will often be a very limited peripheral cross section for radial air flow through the ducts, and there may be loud "siren" noises produced as the rotor duct openings are successively opened and blocked by their passage by the stator coil sides which cross the stator air ducts. When intermediate rings are used on each side of each rotor air duct, the number of rotor bars crossing the ducts can differ from the number of bars in the core sections, while the number of duct bars can be selected to give the minimum siren noise effect and/or the most desirable cross section of duct. Also, the duct bars may be set radially away from the air gap, and their shapes may be chosen in such ways as to favorably affect the air flow and heat dissipation.

Accordingly, the primary object of my invention is to provide a convenient, flexible, and economical method of providing intermediate rings in cast squirrel cage rotors that will enable the above explained advantages in motor design and performance to be secured.

Another important object of my invention is to secure new and greater freedoms in design that will enable a wider range of performance to be obtained while employing fewer than normal rotor slot dies, and other manufacturing tools and motor parts.

Briefly stated, the above objects of my invention are carried out by providing an intermediate ring cast squirrel cage rotor wherein a plurality of slotted laminations are assembled in sections on a shaft, each section consisting of punchings with a chosen number and shape of slots. Between these several core sections are placed a small number of special rotor laminations, called window punchings, designed with slot openings much larger than the regular slots, and with very slender, slanted teeth between the slots; so that, upon casting, the large openings in the window punchings permit the molten aluminum to flow freely through from one core section to the next. The aluminum fills the entire slot area in each window punching, thus forming a complete intermediate ring, except for the interruptions formed by the slender teeth. Since these teeth are slanted radially and are much narrower than the slot width in the adjacent core sections, the metal in the core slots forms a conducting (radial) path bridging each of these slanted teeth and completing the intermediate ring as far as current flow is concerned. The peripheral slot bridge at the outer end of each window punching slot closes the air gap side of the intermediate ring, thereby preventing any metal leakage during casting and avoiding any metal flash on the rotor surface. The radial depth of the window punching bridge is made adequate to collect its share of the radial magnetic flux in the air gap so that the full core length is utilized. The entire structure of rotor bars and intermediate rings is enclosed within the rotor structure thereby eliminating any need for special equipment or procedures during casting.

In those rotors requiring radial air ducts, additional special punchings are placed next to the window punchings on the outside of each inner core section with numbers and shapes of slots chosen to equal the desired number of bars crossing the air duct. Thin axial tubes of steel or other suitable material space the sections of special punchings apart, allowing room for radial air flow, and they also serve to carry the molten metal across the air duct during the casting operation. The number and shape of the duct bars are chosen to minimize the siren noise of the ducts and to provide optimum air flow and cooling.

The intermediate rings permit skewing of the rotor slots, which, preferably, are fewer in number in the rotor core sections than in the stator, so as to minimize the high frequency induced currents in the rotor which give rise to stray losses and reduced accelerating torque.

While the specification concludes with claims particularly pointing out and distinctly claiming the subject matter which I regard as my invention, it is believed the invention will be better understood from the following description taken in connection with the accompanying drawings in which:

Figure 1 is a view in elevation illustrating the external appearance of a rotor prior to insertion in a machine;

Figure 2 is a view in elevation, with parts broken away, showing the arrangement of punchings in the rotor prior to casting the conductor material therein;

Figure 3 is an exploded view of the punchings shown in Figure 2;

Figure 4 illustrates the grid-like secondary winding structure formed by casting aluminum into the slots provided in the punchings shown in Figure 2;

Figure 5 is a perspective view of a portion of the skeletonized winding shown in Figure 4;

Figure 6 is a modification illustrating another method of arranging the window punchings to assure complete casting of conductor bars and intermediate rings in the rotor slots;

Figure 7 is an exploded view showing the relative disposition and arrangement of punchings and parts necessary for providing a rotor having radial ventilation ducts;

Figure 8 is a view in elevation showing an arrangement of spacers between adjacent punchings used in forming air ducts in the rotor;

Figure 9 is a perspective view of the secondary winding structure made by casting molten aluminum in the parts illustrated in Figure 7.

Figure 10 shows a secondary winding cast in the rotor of Figure 7; and

Figure 11 is a modification illustrating a rotor of slightly different design.

Referring now to the drawings wherein like reference characters designate like or corresponding parts throughout the several views, there is shown in Figure 1, a rotor core 10 consisting of a plurality of magnetic steel punchings of various slot designs positioned on a shaft 12 extending axially therethrough. As in usual construction, end rings 14 including fan blades 16 are provided for furnishing strength to the structure and for facilitating flow of air thereover to carry away heat generated by the rotor during machine operation. The punchings are assembled in sections on the rotor, each section comprising an appropriate design and number of slots according to the operating characteristics desired for the particular machine.

In the embodiment shown in Figure 2, a first section 18 is equipped with a plurality of conductor punchings 19, each having a series of slots 20 arranged concentrically therearound and spaced a predetermined distance from the shaft bore 13. The conductor slot 20 is preferably made larger at the inner end to provide optimum operating characteristics while the outer end 22 terminates short of the peripheral surface of each punching so as to enclose the molten metal during casting without surface flash. Punchings having slots with very small openings to the peripheral surface may be used providing such openings are enclosed in some way, as by an outer sleeve, to prevent escape of the metal during casting of the conductors. Other known designs of conductor slots may be employed, although it is preferable that they be wholly contained within the confines of the punchings for simplicity in casting. As illustrated, each section 18 of punchings alternates along the length of the rotor with a second section 26 having a fewer number of punchings 28 and of obviously different design. The latter are referred to as window punchings and each comprises a magnetic steel lamination of the same diameter as the conductor punchings 19. The slot or opening 30 however, is considerably larger and is framed by slender teeth 32 and an outer bridge portion 33 which fills out the peripheral surface of the rotor. After the sections of punchings are assembled in the manner shown, the slots may be fixed in alignment, as by being keyed to the shaft 12. Although the window punching teeth 32 lap over or bisect some of the conductor slots, they do not constitute an appreciable impediment to the flow of aluminum or other conductor material, which is subsequent poured or cast into the aligned slots for forming the squirrel cage winding of the rotor. Therefore, the successive core sections 18, 26, 18, . . . do not need to be aligned, and may have any arbitrary angular rotation with respect to each other. Upon completion of the casting process, all slots are completely filled with aluminum thereby forming the bar conductrs 34 and intermediate rings 36 in the openings provided by the window punchings.

During the course of investigation, many different modifications were constructed and tested and it was found that the conductor slots 20 of successive core sections could either be "stepped," or offset axially along the rotor, or skewed in varying amounts as is common practice in rotors without intermediate rings. Further, it is not necessary that the window punchings be positioned as shown, since it is entirely feasible to reverse them and obtain substantially identical results. The thickness and slant angle of the teeth or framing sides 32 to the radius may also be changed so as to have the window of the punching span a greater or lesser number of conductor slots 20.

In order to determine whether the casting process fully provided an integrally formed secondary winding, rotors having a cast winding therein were submerged in an acid bath to dissolve the steel core, and the remaining gridlike structure showed that complete continuity was established between the conductor bars and intermediate rings throughout the rotor length. This structure is illustrated in Figures 4 and 5, the latter comprising only a portion of the winding of Figure 4.

An analysis of the effects of a rotor constructed in the manner as described above shows that the intermediate rings 36 permit the rotor currents to adjust to be nearly in phase with the opposing stator currents across the whole core length thus nearly eliminating the extra reactance due to spiral, or skew. Any radial tilt of the rotor in the air gap tends to cause unequal magnetic flux densities and forces at the two ends of the core, but this undesirable effect is prevented with this construction, since equalizing currents can flow in the intermediate rings. The use of intermediate rings also enables a larger skew than normal to be employed without undue increase in reactance, thus permitting better control of noise and vibration due to the varying air gap forces.

An alternative construction to obtain these effects would be to use different numbers of slots in each section 18 of the core with window punchings 28 located therebetween.

The modification shown in Figure 6 is substantially the same as that disclosed in Figures 1 through 5 except the window punchings are reversed so that one-half appear as shown in Figure 2 while the other half are flopped over to the position shown in Figure 6. An advantage derived from arranging the punchings in these positions is that the window slots permit the formation of a complete and uninterrupted intermediate ring within the rotor when the winding is cast. In the previous modification, the aluminum is confined to each individual window, although the conductor bars are all connected electrically in the rotor, but in this embodiment, it fills the spaces existing between the exposed surfaces of the teeth 32 and the surface of the adjacent section of the punchings. As is evident, the teeth 32 may assume an angle to the radius either greater or less than that shown.

Referring now to Figures 7, 8 and 9, there is shown in Figure 7, an exploded view of the various sections of punchings and parts necessary in providing a rotor equipped with air ducts used for ventilating and carrying away heat generated by the rotor during machine operation. As in the aforementioned rotors, the conductor bar sections 18 and window punching sections 26 are installed on the shaft in the fashion previously described. In order to provide a structure wherein air may be carried axially through the rotor and then discharged radially through the outer surface to the stator, a third section of special punchings 40 having elongated slots 42 is fixed on the shaft 12 adjacent the window punchings section 26. Depending on the size of the machine and the degree of ventilation required, the slots 42 may be varied in size and/or number to obtain the desired number of bars crossing the duct. As shown in Figure 7, the slots usually are of lesser number than the conductor slots 20 appearing in the section 18. They may be of the same radial height as shown, or they may be made considerably deeper with advantage in some cases. A split spacer ring 44 may be provided for snug mounting on the shaft so as to space the third section 40 from its identical counterpart 46 which, after installation, is located on the other side of the ring. As is evident, since there is a space existing between the adjacent sections 40 and 46, it is necessary to provide communication between the slots 42 located near the peripheral surface of the special punching sections 40 and 46. This is accomplished by utilizing a plurality of steel tubes 48, each of which is designed with an opening to accurately mate with the slots 42 provided in each of the spaced sections 40 and 46. A compact arrangement of parts is obtained by making the axial length of spacer ring 44 and the steel tubes 48 of the same size and the similarity of size serves to confine the aluminum or other conductor material to the closed paths provided through the aligned slots extending the length of the rotor. Sections 26 and 18 appearing at the right side of Figure 7 are then added to the shaft to complete the rotor unit.

An important feature which makes possible the successful and speedy casting of molten metal across the duct space resides in assembling the special punching sections 40 and 46, spacer ring 44 and steel tubes 48 as a unit. These parts are separately assembled and aligned and then spot welded at convenient points to form an integral unit which is subsequently installed on shaft 12 during the course of assembling the various sections to form the rotor. In prior practice, it was extremely difficult to cast the winding across the duct space because the conductor slots are spiraled and the steel tubes have sides parallel to a plane passing perpendicularly through the shaft. As a result, it is not practical to obtain a tight fit between the steel tubes and sides of the punchings, and molten metal escapes through the openings during the casting process. The sides of the steel tubes could be shaped to the angle of the spiraled slots, but this is an expensive and uneconomical practice. Therefore, it is preferable to have the duct bars cross the air duct in a line parallel with the shaft axis. This is obtained in the embodiment disclosed herein by welding the steel tubes to the flat sides of the special punchings 40 and 46 so that they extend across the duct in a straight line, even though the conductor slots in the adjacent core sections are skewed. The keyway 41 provided in each of the special punching sections 40 and 46 is made slightly larger to permit slight angular movement of the unit on the shaft. Reference to Figure 9 will show that the duct bars are offset from the spiraled conductor bars but the intermediate rings 36 establish firm electrical and mechanical connection therebetween. This figure also clearly shows how the intermediate rings make possible the use of a greater or lesser number of duct bars across the duct space than the number of slots in the core sections.

It is obvious that in cases where a greater number of air ducts is desired, sections 40 and 46 along with their associated split rings 44 and steel tubes 48 can be provided individually or as units at appropriate points spaced along the length of the rotor core. The detailed view illustrated in Figure 8 shows more clearly how the steel tubes 48 are designed to encompass the slots 42 provided in each of the sections 40 and 46. The duct elements between adjacent core sections can be the same for a given rotor diameter, regardless of the slot number and shape in the core sections. Thus, a standardized duct element is possible, with reduced manufacturing cost, as compared with the large number of different duct tubes and spacers required to suit different punching designs in conventional rotors.

Subsequent to casting a rotor designed in the manner illustrated in Figure 7, the steel punchings were dissolved from the secondary winding structure formed, providing the partial and complete views of such structure shown in Figures 9 and 10. These clearly illustrate the relative positions of the intermediate rings, the conductor bars and the aluminum bar material as it crosses the air ducts. The conductor bars 34 are firmly bonded to end rings 14 including the fan blades 16 formed on the outer end thereof. The intermediate ring 36 is integrally formed with the conductor bars 34 on one side, and the aluminum air duct bars 50 shaped by the tubes 48 are firmly anchored to adjacent sides of the intermediate rings 36. The arrows illustrate the direction of air flow from the central part of the rotor to a radial duct, not shown, that will appear at the opposite point on the inner peripheral surface of the machine stator.

The factors predominantly contributing to the high degree of siren noise in squirrel cage rotors of the prior art are that the rotor bars cross the ducts within a very short distance of the rotor air gap, and their number is not far different from the number of stator slots. Since there are a large number of bars rotating at high speed, objectionable high frequency sound is produced. At a typical frequency of 1800 cycles, the wavelength of sound in air is approximately seven inches which tends to create resonant effects with usual motor dimensions and construction. The magnitude of this noise rises rapidly with a decrease in the difference between stator and rotor slots. For example, if the difference in slots were only two, there would be only two cycles of sound variation around the periphery, which would create a tremendous variation in air pressure over a large portion of the peripheral surface at the same time.

The above factors contributing to the undesirable noise are successfully overcome by the new design of rotor disclosed above, by displacing the rotor bars where they cross the ducts radially inward by possibly one-fourth to one-half inch, although displacements of greater or lesser values may be used. This is accomplished by the design and location of the duct punching slots and the spacer members 48 located between adjacent sections 40 and 46. The high frequency noise produced by a large number of rotor bars rotating at high speed may be further substantially reduced by making the number of rotor bars where they cross the ducts fewer or greater in number than in the core itself, so as to avoid the resonant frequencies of the stator air passages. The provision of the different number of rotor bars across the ducts is obtained by the combined use of window and special duct punchings which form the ends of adjacent core sections. The window punchings serve as adapters, allowing the aluminum to flow freely from the conductor slots into the different number of duct slots, and vice-versa. Since all of the special punchings have continuous steel slot bridges 33, they do not require any special casting provisions whatever. By this means, the number of rotor bars crossing the rotor ducts may be selected of such a low number as to markedly reduce the frequency of the noise and also greatly increase the number of cycles of variation in noise around the periphery. Control of these vital factors in the rotor reduces the duct noise or siren effect to a small fraction of its normal value.

In the embodiment shown in Figure 11, the rotor is constructed in a substantially different manner by assembling conductor bar punchings into sections 70 and 72 on shaft 12. These sections are spaced by a third section of laminations 74 having a diameter less than the distance between the bottom of any two opposite slots in the punchings of sections 70 and 72. This arrangement obviously creates a void space 76 and in order to prevent escape of molten metal therefrom during casting, and to expose an iron surface to the flux crossing the air gap, a steel ring 78 machined to the axial dimension of the space, is secured in the position shown by spot welds located at preselected points between the ring and adjacent sections 70 and 72.

After casting of the secondary winding in the rotor, end rings 80 including fan blades are integrally connected with conductor bars in slots 82 and the intermediate ring 73 fills void space 76 centrally of the rotor. Obviously, a greater number of sections 70 and 72 alternating with rings 78 may be provided according to the type and operating characteristics desired from the rotor constructed in this manner.

In all modifications, the window punchings provide intermediate rings connecting all of the bars electrically around the periphery of each duct. These intermediate rings permit the conductor bar currents to adjust themselves, to exactly oppose the stator current over each core section, thus nearly eliminating the extra reactance ordinarily associated with rotor skew. This in turn permits the use of fewer rotor slots with skew without encountering the usual difficulties of locking when the slots are not skewed. The need for rotor slot insulation is also eliminated.

The concept of using window punchings at spaced intervals along the rotor is of particular importance in achieving desirable operating characteristics in motors. The following benefits or advantages are offered by this new construction:

(1) They nearly eliminate the extra reactance due to spiral, thereby permitting the use of fewer rotor slots without encountering as much reactance as in the past, while simultaneously overcoming obstacles which heretofore limited the design of squirrel cage rotors.

(2) They permit the rotors to be spiraled more than one slot pitch without sacrifice of performance and therefore allow excellent smoothing of torque and vibratory forces to be obtained.

(3) The rotor slot insulation formerly required when the rotors are skewed is now not necessary.

(4) Since the window punchings serve as adapters, and permit the free flow of aluminum across the space between adjoining rotor sections, different numbers and shapes of slots may be used in the various sections of the rotor.

(5) The window punchings make possible the use of a different number of rotor bars crossing the air duct spaces than conductor bars appearing in the same rotor core. Since the air duct noise is critically dependent on the number of rotor duct bars, it is extremely desirable to divorce the number of bars in the ducts from the number of conductors bars in punchings.

(6) The window punchings also allow slots of any different section to be used in the same rotor, and therefore, permit fine gradations of torque and current to be obtained by using different percentages of two standard punchings, in lieu of making different punchings for different motors. Similarly, it permits motors to be made with losses concentrated in only one part of the rotor length, thus making possible an adjustment of the temperature distribution over the length of the motor.

The above-cited advantages are obtained without any change whatever in the standard casting equipment or procedures. The only substantial modification necessary is that of providing a few extra punchings of the window variety and inserting them in the stack at suitable intervals. The finished rotor incorporates the full length of iron in the air gap, thereby effectively utilizing the full area of the air gap to carry magnetic flux.

It is apparent that many modifications and variations are possible in light of the above teachings. It is therefore to be understood that within the scope of the appended claims, the invention may be practiced otherwise than as specifically described.

What I claim as new and desire to secure by Letters Patent of the United States is:

1. An intermediate ring squirrel cage rotor comprising a shaft supporting a plurality of punchings having slots, said punchings comprising a series of sections alternately disposed along the shaft and including first sections having a plurality of closed conductor slots of the same configuration throughout the length of the rotor spaced concentrically at equal distances from the shaft and terminating short of the peripheral surface of the punchings, second sections of punchings interposed between said first sections and comprising closed window slots each having an opening of sufficient area to extend diagonally across at least a portion of two adjacent conductor slots formed in said first sections of punchings, the opening in each of said slots being defined by outer and inner walls joined with side walls and wherein said outer and inner walls lie in planes concentric with the shaft, and a cast secondary winding in said rotor completely filling the slots of said first and second sections so as to provide a secondary winding including conductor bars extending the length of said rotor and all electrically interconnected with each other by an intermediate ring of minimum impedance appearing in the closed window slots for providing a path of low impedance for current flow between the bar conductors.

2. A squirrel cage rotor comprising a shaft supporting a plurality of sections of punchings having slots for receiving bar conductors, each of the sections of punchings having their slots displaced peripherally with respect to the other sections on the rotor shaft, a section of punchings having window slots therein supported by said shaft and positioned between adjacent conductor bar sections of punchings, each of said window slots being of an area sufficient to encompass more than one conductor slot, and a secondary winding in said rotor completely filling said conductor bar slots and forming an intermediate ring in said window slots for bridging the conductor bar slots, said intermediate rings being electrically connected completely around said rotor and effective in providing a low impedance path for circulation of currents between peripherally adjacent conductor bars and said rings, and end rings on opposite sides of said rotor for carrying away heat during operation.

3. The combination according to claim 2 wherein the conductor bar slots in each of said sections of punchings are of a different configuration.

4. The combination according to claim 2 wherein said conductor bar slots are skewed along the rotor length and the conductors therein are not insulated from the conductor bar slot walls.

5. A squirrel cage motor comprising a stator and a rotor, said rotor comprising a shaft supporting a pair of sections of punchings having conductor bar receiving slots therein, a pair of sections of window punchings on said shaft each having slots of sufficient area to encompass radially and peripherally more than one conductor bar slot, said sections of conductor bar and window punchings being disposed on said shaft in a manner wherein the conductor bar sections are positioned adjacent the ends of said shaft and the window punching sections are positioned inwardly thereof and having their exposed punching surfaces in contact therewith, a special pair of punching sections on said shaft inwardly of said window punching sections and being equipped with slots lesser in number than the conductor bar slots, but greater than the window punching slots, an axial space between said special punching sections, a plurality of hollow tubes each having an opening spaced to the configuration of the special slots and peripherally spaced and positioned in the space between the special punching sections and in contact therewith, a winding filling the slots provided in the conductor bar, window, special slots and the tubes, and axially disposed openings extending from each end of the rotor through said sections of punchings and terminating in said space for providing a path for ventilating air which flows axially therethrough prior to discharge radially past said hollow tubes toward cooperating air ducts positioned in said stator, and end rings on the end of said rotor for facilitating air flow through the rotor and stator cores.

6. The combination according to claim 1 wherein the side walls between the slots in the punchings of said second sections are formed at an angle to the radius of said punchings.

7. The combination according to claim 1 wherein a portion of the punchings of said second section are reversed thereby forming an area between said first sections capable of providing a mechanically uninterrupted intermediate ring extending completely around but within said rotor when said winding is cast therein.

8. The combination according to claim 5 wherein said slots for said conductors are skewed along the length of the shaft.

9. The combination according to claim 8 wherein said duct bars bridge said space in a line extending axially of said shaft.

References Cited in the file of this patent

UNITED STATES PATENTS

| | | |
|---|---|---|
| 1,686,699 | Lauffer et al. | Oct. 9, 1928 |
| 1,694,061 | Hansen et al. | Dec. 4, 1928 |
| 2,047,831 | Lund | July 14, 1936 |
| 2,067,605 | Griffin | Jan. 12, 1937 |
| 2,176,871 | Harrell et al. | Oct. 24, 1939 |
| 2,243,021 | Takenouchi | May 20, 1941 |
| 2,421,860 | Winther | July 10, 1947 |
| 2,528,960 | Klima | Nov. 7, 1950 |

FOREIGN PATENTS

| | | |
|---|---|---|
| 690,541 | Germany | Apr. 27, 1940 |
| 740,689 | Germany | Oct. 27, 1943 |
| 437,728 | Italy | July 9, 1948 |